UNITED STATES PATENT OFFICE.

JULIUS ABEL, OF LUDWIGSHAFEN, GERMANY, ASSIGNOR TO THE BADISCHE ANILIN AND SODA FABRIK, OF SAME PLACE.

GREEN-BLACK DYE.

SPECIFICATION forming part of Letters Patent No. 644,959, dated March 6, 1900.

Application filed December 19, 1899. Serial No. 740,896. (No specimens.)

*To all whom it may concern:*

Be it known that I, JULIUS ABEL, doctor of philosophy, a citizen of the free and Hanse town of Hamburg, residing at Ludwigshafen-on-the-Rhine, in the Kingdom of Bavaria, Germany, have invented new and useful Improvements in Green-Black Coloring-Matters, of which the following is a specification.

My invention relates to the manufacture of new green-black coloring-matter by the treatment of a certain diphenylamin derivative with sulfur and sodium sulfid. The said diphenylamin derivative is obtained by the condensation of di-nitro-chlor-benzene with ortho-amido-phenol-para-sulfoacid under suitable conditions. The condensation of the ortho-amido-phenol-para-sulfoacid with dinitro-chlorbenzene leads to the production of a new ortho-hydroxy-dinitro-diphenylamin-sulfoacid, and this, after the treatment with sulfur and sulfid of sodium, yields a coloring-matter that dyes unmordanted cotton green-black. The condensation with dinitro-chlor-benzene is effected in the presence of bodies that are capable of binding hydrochloric acid.

Judging by the method of formation the new initial material for use in making my coloring-matter has the following constitutional formula:

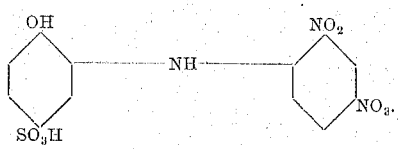

The following example will serve to further illustrate the manner in which my invention can be carried into practical effect and my new coloring-matter obtained. The parts are by weight:

*Example—Production of green-black coloring-matter from ortho-hydroxy-dinitro-diphenylamin-sulfoacid.*—Prepare the required diphenylamin derivative by heating in a vessel furnished with an inverted condenser an aqueous solution of the sodium salt of ortho-amido-phenol-para-sulfoacid with the equimolecular proportion of dinitro-chlor-benzene and with a sufficient quantity of sodium acetate or soda to bind the hydrochloric acid that is set free. Continue the heating until the dinitro-chlor-benzene has practically disappeared. Allow the mixture to cool. The desired diphenylamin derivative separates out in part in the form of its sodium salt as a yellow-red crystalline precipitate. Add common salt to complete the separation, collect, and dry. Mix together forty-two (42) parts of the dry ortho-hydroxy-dinitro-diphenylamin-sulfoacid salt thus obtained with one hundred and fifty (150) parts of crystallized sodium sulfid, forty (40) parts of sulfur, and ten (10) parts of water. Heat the mixture slowly to about one hundred and sixty degrees centigrade. When the evolution of gas has ceased and the reaction mass has become dry, raise the temperature to about one hundred and seventy degrees and continue heating for some time at this temperature. Allow the mass to cool and reduce it to powder. The product so obtained can be used directly in dyeing.

My new coloring-matter is readily soluble in water, giving a green solution, and can be precipitated from its aqueous solution by means of hydrochloric acid or of ammonium chlorid, the precipitate being brown-black and flocculent. It possesses a strong affinity for unmordanted vegetable fiber, which it dyes green-black with an excellent fastness against the action of light, acids, soap, and alkalies. The treatment of the dyed goods with chromates, copper salts, and the like does not materially alter or add to the fastness of the shades produced.

Now what I claim is—

The new coloring-matter which can be obtained from ortho-hydroxy-dinitro-diphenylamin-sulfoacid, sodium sulfid and sulfur, which is readily soluble in water giving a greenish solution from which hydrochloric acid and ammonium chlorid precipitate a brown-black flocculent precipitate and which dyes unmordanted cotton giving green-black shades which are not materially altered by treatment with chromates and copper salts, substantially as described.

In testimony whereof I have hereunto set my hand in the presence of two subscribing witnesses.

JULIUS ABEL.

Witnesses:
ERNEST F. EHRHARDT,
MAX BAZLEN.